United States Patent [19]

Sciupac

[11] Patent Number: 5,029,125
[45] Date of Patent: Jul. 2, 1991

[54] METHOD OF READING AND WRITING FILES ON NONERASABLE STORAGE MEDIA

[75] Inventor: Luis H. Sciupac, Santa Clara, Calif.

[73] Assignee: Drexler Technology Corporation, Mountain View, Calif.

[21] Appl. No.: 320,020

[22] Filed: Mar. 7, 1989

[51] Int. Cl.⁵ ............................................. G06F 13/14
[52] U.S. Cl. ..................................... 364/900; 364/964; 364/968.1; 364/964.6; 365/218
[58] Field of Search ... 364/200 MS File, 900 MS File; 365/218

[56] References Cited

U.S. PATENT DOCUMENTS

| | | | |
|---|---|---|---|
| 4,287,568 | 9/1981 | Lester | 364/900 |
| 4,298,932 | 11/1981 | Sams | 364/200 |
| 4,382,279 | 5/1983 | Ugon | 364/200 |
| 4,394,745 | 7/1983 | Menezes et al. | 364/900 |
| 4,414,644 | 11/1983 | Tayler | 364/900 |
| 4,437,155 | 3/1984 | Sawyer et al. | 364/200 |
| 4,558,176 | 12/1985 | Arnold et al. | 364/900 |
| 4,680,736 | 7/1987 | Schrenk | 365/218 |
| 4,691,299 | 9/1987 | Rivest et al. | 365/218 |

OTHER PUBLICATIONS

Roy J. Slicker, "System Software for the Write Once Optical Disk", printed transcript of a speech, undated.
Optical Storage Solutions, "Anouncing Optical Storage Software for the Single/Multi-User Environment", 1987.

*Primary Examiner*—Allen R. MacDonald
*Assistant Examiner*—Debra A. Chun
*Attorney, Agent, or Firm*—Schneck & McHugh

[57] ABSTRACT

A method of inputting and outputting information files between a computer memory and a write-once medium in which a cache memory is established as an intermediary between an operating system's transfer address and the medium. The cache includes a system file allocation structure in a format corresponding to that for erasable media and a media directory file area. The directory in the write-once medium is read to the cache and the system file allocation structure is constructed from the directory information. When performing an operating system command, such as a read or write, access to the medium is made via the cache memory. For example, when reading a data file, sector locations indicated by the system file allocation structure are first mapped to corresponding sectors in the medium directory file area and the corresponding sectors are read from the medium. When writing a data file, sectors containing new data are identified, old sectors on the medium are marked, and only the new sectors are written to the medium with pointers linking them to the unchanged sectors.

9 Claims, 8 Drawing Sheets

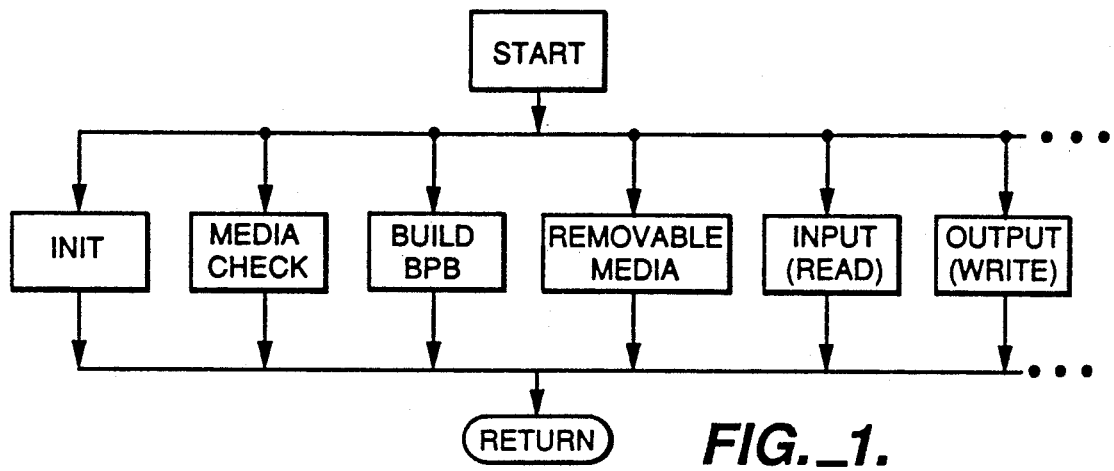
FIG._1.
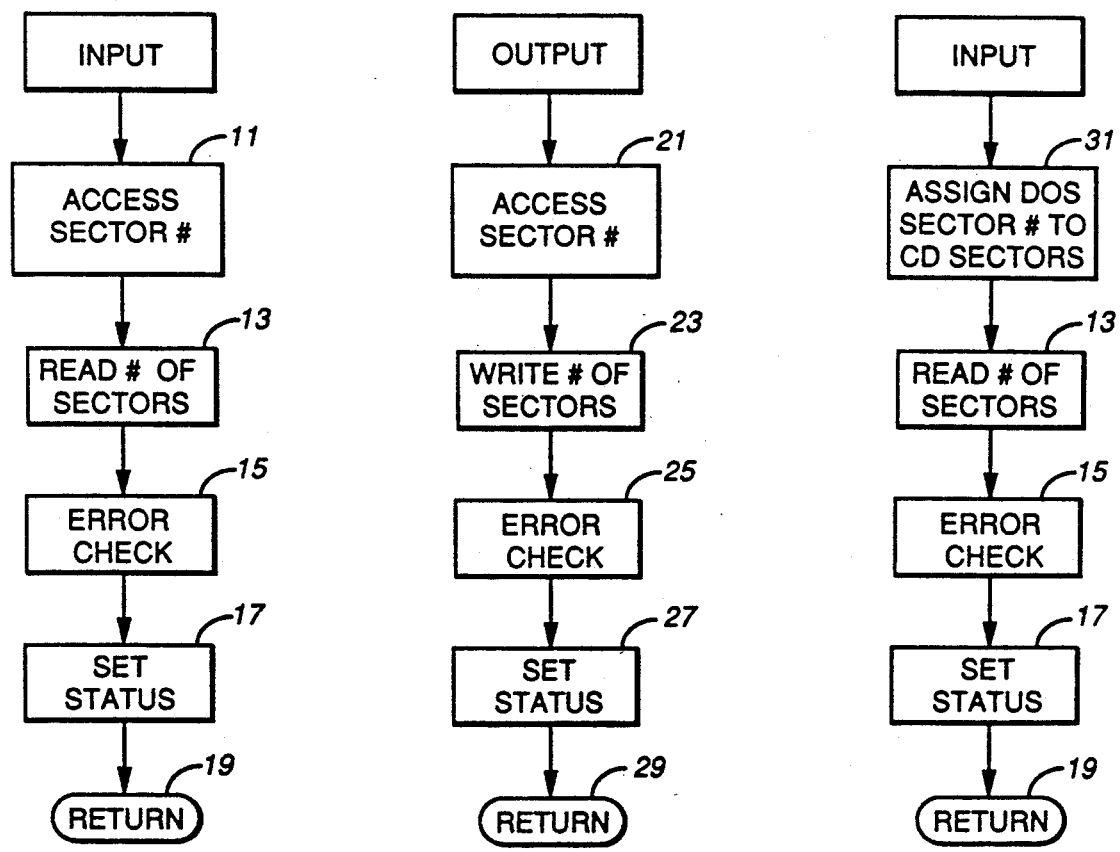
FIG._2A. (PRIOR ART)
FIG._2B. (PRIOR ART)
FIG._3A. (PRIOR ART)

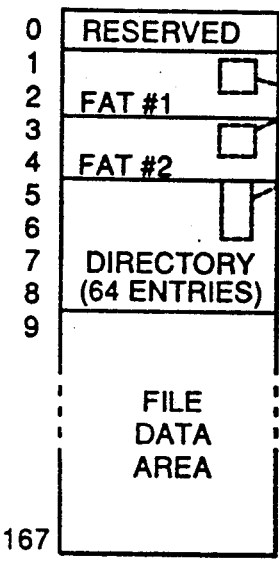
FIG._4.
(PRIOR ART)
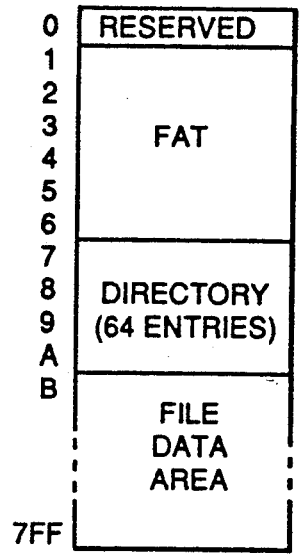
FIG._6.
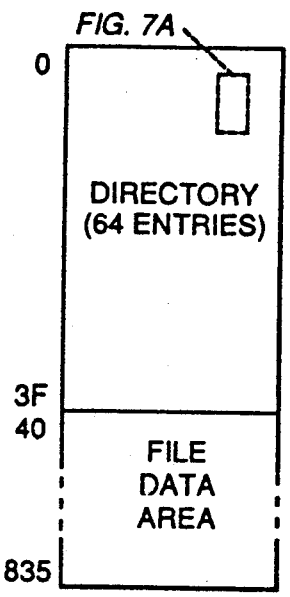
FIG._7.
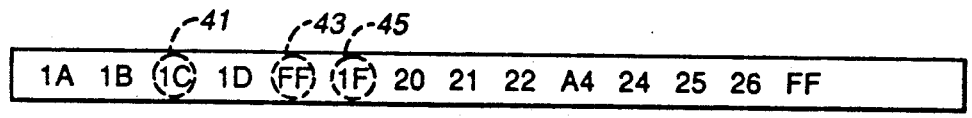
FIG._5A.
FIG._5B.
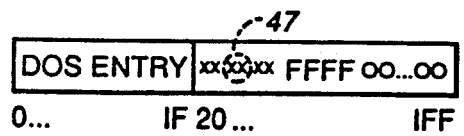
FIG._7A.
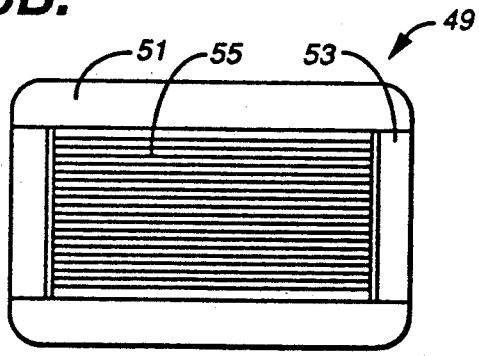
FIG._8.

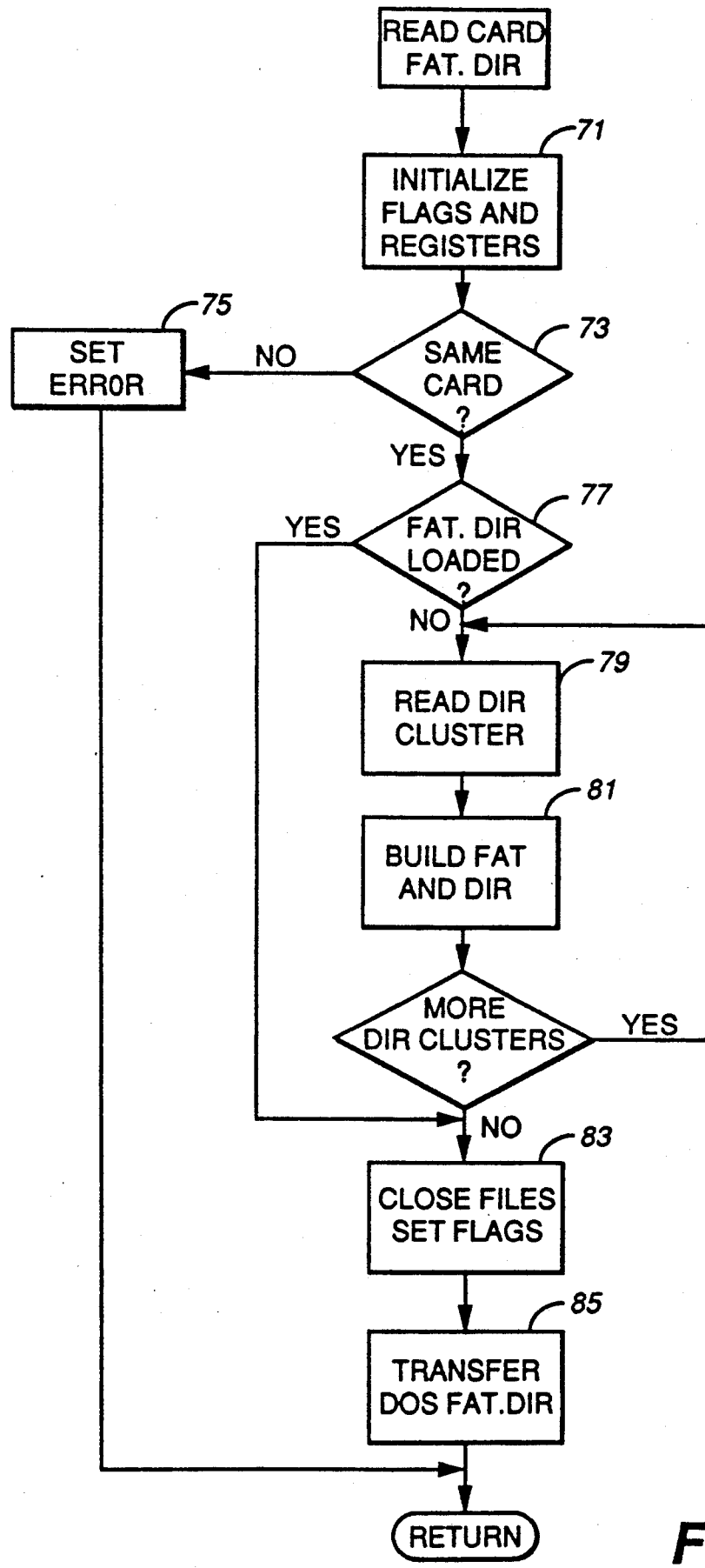
FIG._10.

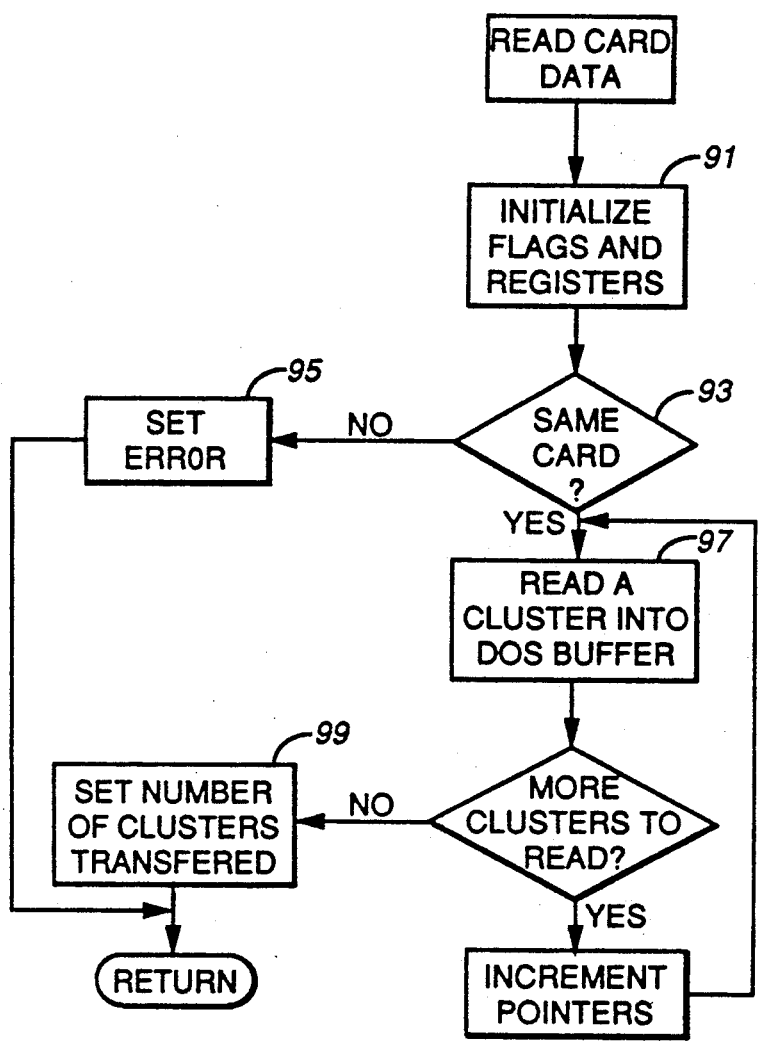
FIG._11.
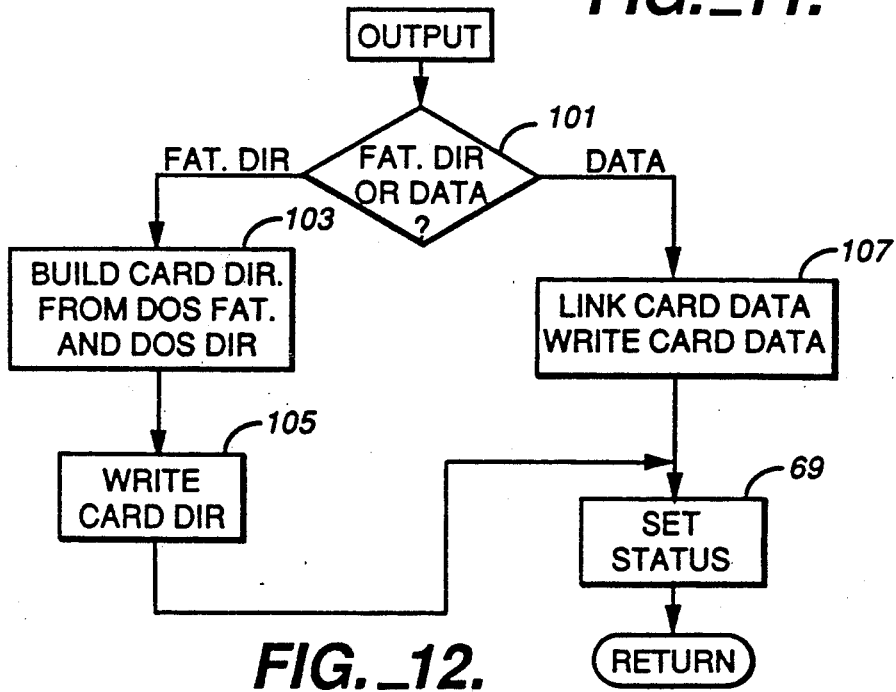
FIG._12.

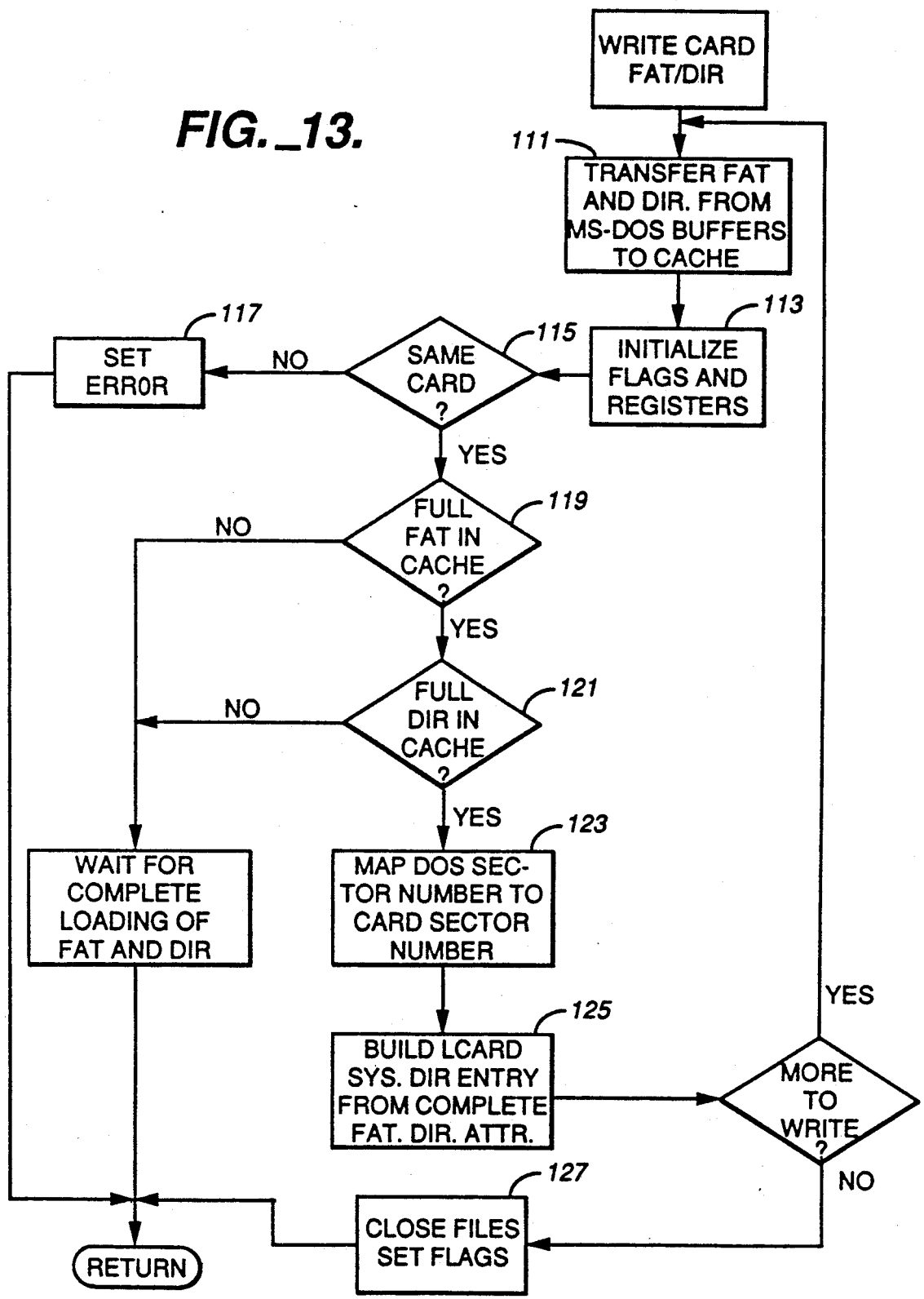
FIG._13.

FIG._14.
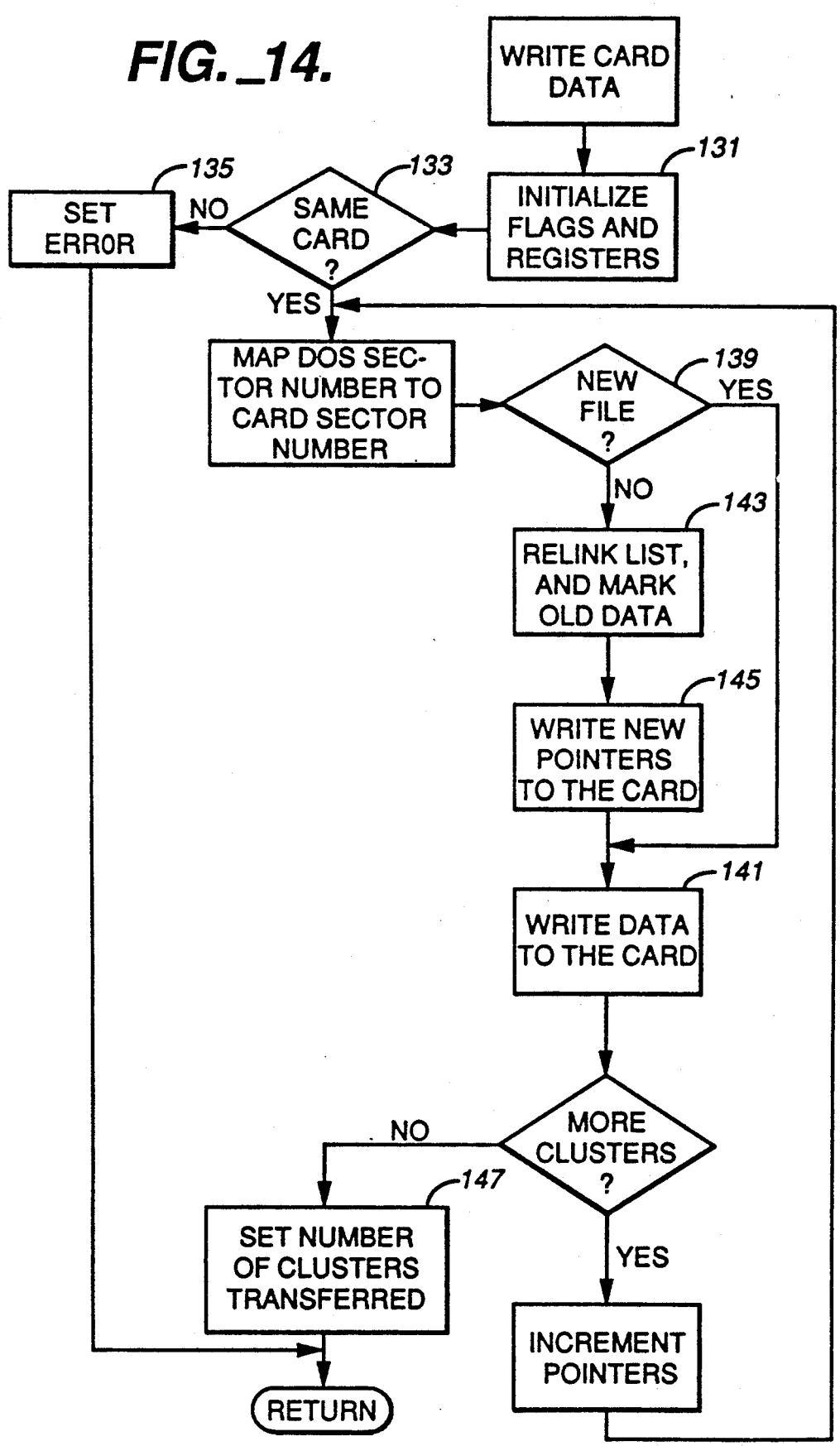

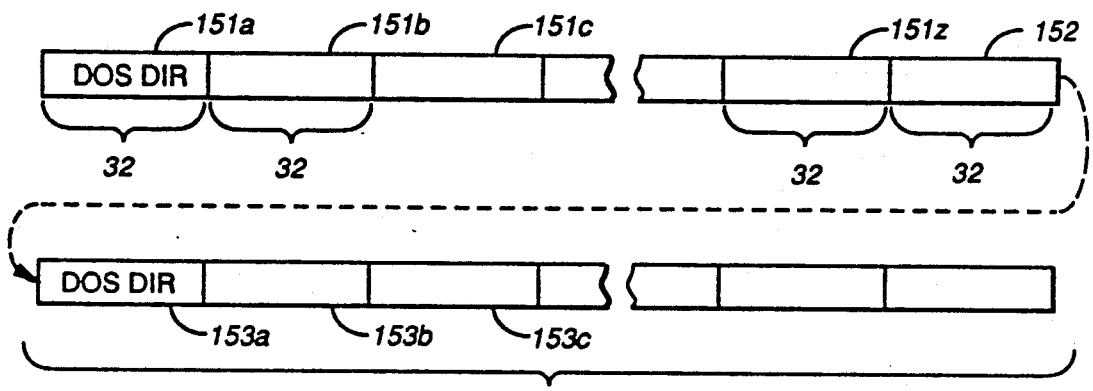
FIG._15.
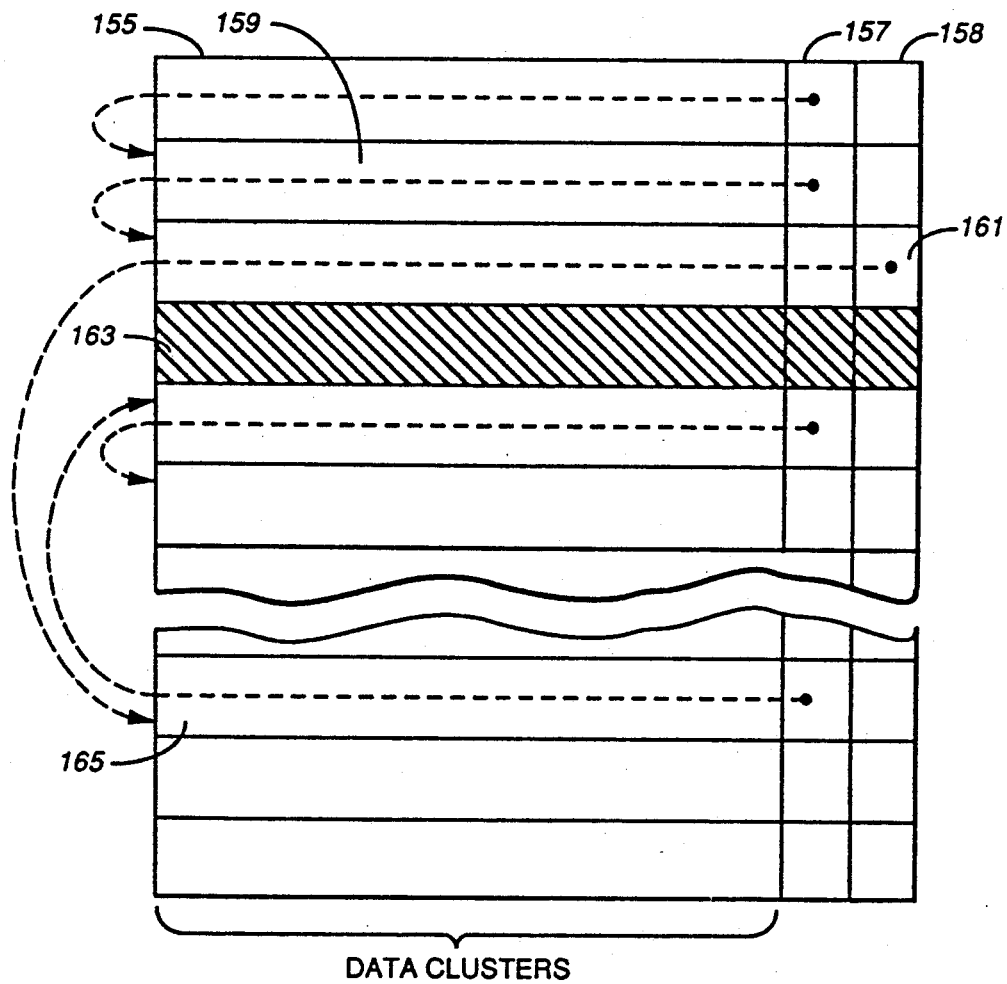
FIG._16.

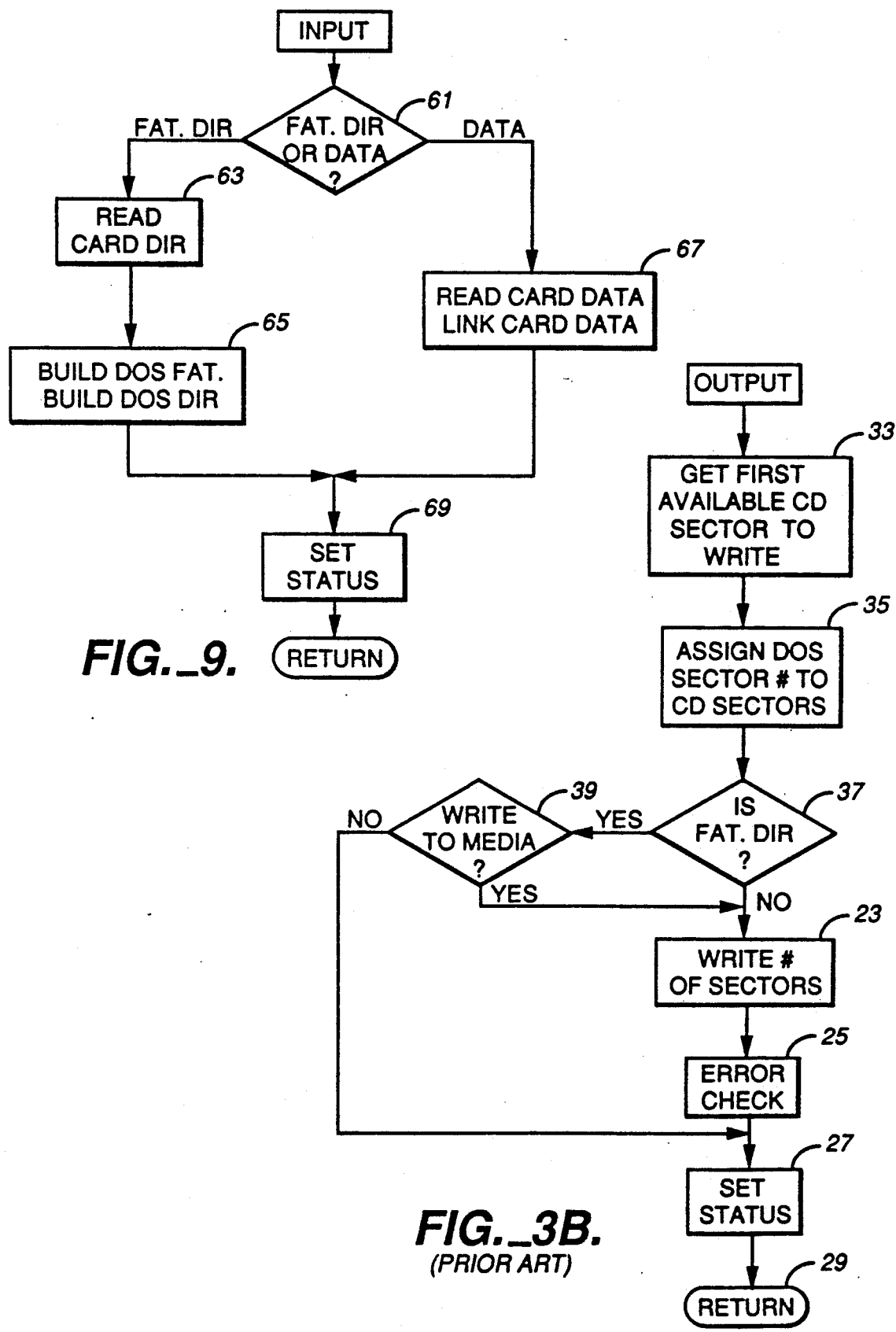
FIG._9.
FIG._3B.
(PRIOR ART)

METHOD OF READING AND WRITING FILES ON NONERASABLE STORAGE MEDIA

DESCRIPTION

1. Technical Field

The present invention relates to device drivers for coordinating transfer of information in the form of directories and data files between a computer operating system and peripheral input/output device, and in particular to a method of reading and writing such files on a write-once read-many, i.e. nonerasable, data storage medium.

2. Background Art

Software that runs a computer system is typically organized into layers with varied degrees of independence from the computer hardware. The most hardware-independent layer is usually an application program, such as a word processing or spreadsheet program, which performs a specific job and deals with data in terms of files and records within files. The middle layer is the operating system kernel, which manages the allocation of system resources, such as memory and disk storage, and implements disk directories and other housekeeping details of disk storage. The most machine dependent layer comprises device drivers, which are components of the operating system that manage the controller of a peripheral device, such as a magnetic disk drive. Device drivers are responsible for transferring data between a peripheral device and a computer's RAM memory, where other programs can work on it. Drivers shield the operating system kernel from the need to deal with peculiarities of a particular peripheral device, such as the I/O port addresses and operating characteristics of a device, just as the kernel, in turn, shields application programs from the details of file management.

Device drivers for magnetic storage devices access and update file allocation tables and directories, as well as data, on the storage medium several times during the execution of a single command for the operating system. This is done to maximize the performance of the disk, allowing more efficient retrieval the next time this information is required, as well as to change file attributes. This transfer of information involves the reading and writing of multiple sectors over and over again. However, since the magnetic medium is erasable this is not a problem, and will not result in a loss of storage capacity. On the other hand, currently available optical storage media, such as CD-ROM and laser recordable direct-read-after-write media, are nonerasable. These media are therefore often called write-once read-many (WORM) media, or just write-once media. Since write-once media are not erasable, each time a file is updated, capacity is lost. Multiple recordings of file allocation tables and directories during a single command are especially troublesome, as capacity is exhausted up to three times faster than is necessary.

Accordingly, it is an object of the present invention to provide a method of reading and writing files (including directories) on a write-once or nonerasable medium which does not deplete the medium's storage capacity as rapidly as currently known methods, while still allowing fast access to files stored on the medium.

DISCLOSURE OF THE INVENTION

The above object has been met with a method of transferring files between an operating system and a nonerasable medium in which a directory on the medium is read into a cache memory and operating-system-type file allocation table (FAT) and directory corresponding to FAT and directory for erasable media are constructed from the directory in the cache memory. Transfer of data is done indirectly through the cache memory. As it performs a command requested by the user, the operating system can modify the file allocation table or change file attributes in the cache memory without actually writing on the medium. Only when the operating system finishes updating the cache memory by completion of a full command, and the data in the cache is ready for writing, does the driver update the actual medium. Not only does the driver determine when to write on the medium, but it may also determine the best way to store the data for most efficient retrieval, as for example, by writing only that information which has changed.

BRIEF DESCRIPTION OF THE DRAWINGS

FIG. 1 is a flowchart of a device driver interrupt routine for both the prior art and the present invention.

FIGS. 2A and 2B are flowcharts showing a prior art method of carrying out input and output steps of the routine in FIG. 1 for standard magnetic media.

FIGS. 3A and 3B are flowcharts showing another prior art method of carrying out input and output steps of the routine in FIG. 1 for a compact optical disc.

FIG. 4 is a schematic representation of a file allocation structure of the prior art stored in both operating system memory and standard magnetic media.

FIGS. 5A and 5B are schematic representations of portions of the file allocation structure of FIG. 4, illustrating FAT and directory entries.

FIG. 6 is a schematic representation of a file allocation structure of the present invention stored in operating system memory and a cache memory.

FIG. 7 is a schematic representation of a file allocation structure of the present invention stored in a temporary memory buffer and on a write-once medium.

FIG. 7A is a schematic representation of a portion of the structure in FIG. 7, illustrating a directory entry on the medium.

FIG. 8 is a top plan of a write-once optical storage medium in card format for use with the method of the present invention.

FIG. 9 is a flowchart showing a method of the present invention for carrying out the input step of the routine in FIG. 1 for write-once media.

FIGS. 10 and 11 are flowcharts detailing portions of the steps in FIG. 9.

FIG. 12 is a flowchart showing a method of the present invention for carrying out the output step of the routine in FIG. 1 for write-once media.

FIGS. 13 and 14 are flowcharts detailing portions of the steps in FIG. 12.

FIGS. 15 and 16 are schematic representations of alternative directory entries from that depicted in FIG. 7A.

BEST MODE FOR CARRYING OUT THE INVENTION

With reference to FIG. 1, a block device driver interrupt routine performs one of six general functions, initialization, media check, build BIOS parameter block, removable media, input and output, then returns control to an operating system kernel. A device driver is a process of transferring information between a storage medium and a computer memory, and vice versa, as requested by a computer operating system. In general, the driver for a particular device must first be called by the operating system from the linked chain of available drivers and the characteristics of the particular device identified. For example, printers are character type devices which require data to be transferred byte by byte in a serial manner, while disk drives are block type devices in which data is transferred in clusters of bytes. The present invention relates to block type driver methods. Next, a strategy routine queues the requested operation to be performed by the device so that transfer of data does not slow other computer operations down. Finally, the interrupt routine shown in FIG. 1 performs the requested operation.

Operations that the interrupt routine may perform include initialization, in which the presence and functioning of the hardware device is checked and any necessary initialization, such as moving a disk drive head to track 0, is performed; media checks, in which any change in media that would affect access, such as a change from a single-sided to double-sided or 8 sector to 9 sector disk, is reported; building a BIOS parameter block with a media descriptor code whenever changes in media are reported; reporting whether the media is removable from its drive or not; and input and output. Other functions may also be added, if desired.

The following disclosure is made with reference to the MS-DOS operating system provided by Microsoft Corporation, and the laser-recordable optical medium in card format sold under the tradename "LaserCard" by Drexler Technology Corporation, the assignee of the present application. It will, however, be recognized by persons of ordinary skill in the art that the method of the present invention is also applicable to other operating systems, such as Unix or Macintosh Operating System in conjunction with other forms of write-once media, such as nonerasable magnetic media and other types of optical media, in card, disk, tape, drum formats and the like. As a clear understanding of the way MS-DOS and other operating systems handle file transfers to and from erasable media is critical to understanding the present invention, and its method of file transfer with respect to write-once media, the current file transfer method for erasable media will be briefly discussed first. Any additional information on the MS-DOS operating system and installable device drivers therefore may be obtained in "IBM-PC Technical Manual", "The MS-DOS Encyclopedia", and "Microsoft MS-DOS Operation System Programmers' Reference", three publications well known in the art. As far as the present invention is concerned, only the steps involving input and output, i.e. reading and writing information on a nonerasable medium, are different from the steps used with erasable media.

With reference to FIG. 2A, input of files stored on erasable magnetic media begins by accessing (Step 11) the starting sector number requested by the operating system. As will be discussed below, the file directory and file allocation table are stored on specified sectors of the media which are known to the operating system, while the starting sector numbers of data files are specified in the file directory. When accessing the sector number, the read head of the media drive is physically moved to the location of the starting sector number. Next, the appropriate number of sectors is read (Step 13). The information stored in these sectors is transferred to computer memory at an address, called the transfer address, specified by the operating system. Errors are checked for (Step 15) and the number of words successfully transferred is reported (Step 17). Command is then returned (Step 19) to the operating system kernel.

With reference to FIG. 2B, output of files to erasable magnetic media is similarly straight forward. The starting sector number is accessed (Step 21) by physically moving the write head to a sector location of the media which is available for writing. The appropriate number of sectors is written (Step 23), the file information being transferred from the transfer address in computer memory to available sectors of the media. Errors are checked for (Step 25) and the number of words successfully transferred is reported (Step 27). Command is then transferred to the operating system kernel (Step 29. It is noted that a typical operating system command, such as a copy, may involve multiple reads and writes to the same sectors. In particular, the file directory and file allocation table may be updated several times before the command is completed. The erasability of magnetic media allows these multiple outputs without incurring a loss in storage capacity.

With reference to FIG. 3A, one file transfer method of the prior art for CD-ROM, a type of nonerasable optical medium, uses a mapping of operating system sector numbers to medium sector numbers to deal with the rewriting of a file to a different location of the medium. The steps for inputting a file are the same as those for magnetic media except for the access sector number step 31. Here, a determination is first made as to whether any of the sectors have been reassigned. If not, then the process is the same as for magnetic media. If a reassignment has been made, as for example by updating a file, then a relationship is established between the operating system sector numbers, which assume media erasability, and the currently assigned media sector numbers. This mapping is used to move the read head to the correct sector of the media so that the updated sectors can be read.

With reference to FIG. 3B, outputting a file to CD-ROM begins by locating and moving the write head to the first available sector of the media for writing, shown as step 33. Briefly, it is determined whether or not the sector requested by the operating system is already used. If not, then writing proceeds the same as for magnetic media. If the sector is already used, then the sector is mapped (Step 35) to a new location on the medium. If the file to be written is a file allocation table and directory (Step 37), then it is first determined (Step 39) whether this is an update and if so the file allocation table and directory are written to a new location on the media. Typically, the entire file allocation table is rewritten each time any change is made.

With reference to FIG. 4, a typical file allocation structure of the MS-DOS operating system, provided by Microsoft Corp., for information stored on both an erasable magnetic medium and in computer memory, comprises a plurality of sectors, typically holding 512 bytes each. Sector 0 is reserved for boot instructions. Two copies of a file allocation table (FAT), each two sectors long, are assigned to sectors 1 to 4. A directory capable of holding 64 32-byte entries is assigned to sectors 5 to 8. The remaining sectors of the medium are for storing all other files, i.e. data files.

As seen in FIG. 5B, a directory entry includes an 8 byte filename and 3 byte filename extension that identifies the file so that it can be called by the computer operating system. A file attribute byte B follows the filename extension and indicates whether the file is a read-only file, hidden file, system file, volume label, etc., since typically each type of file is handled differently and has a different priority in memory. These attributes can be changed as desired by calling the appropriate system command. Bytes C to 15 are reserved. Four bytes are assigned to the time and date when the file was created or last updated. Bytes 1A and 1B store the number of the starting cluster of the file in the file data area, and four bytes 1C to 1F indicate the size of the file in bytes.

Using the directory and file allocation table any file on the medium can be located. First locating the filename in the directory, the starting cluster in bytes 1A and 1B of that entry is identified. The file allocation table, a portion of which is seen in FIG. 5A, contains pointers 41 to the next cluster in the same file. An end pointer 43 is indicated by the designation FF. Thus, if the starting cluster in the entry in FIG. 5B is cluster 1E, then referring to the file allocation table in FIG. 5A we advance 45 bytes (each FAT entry being 1 ½ bytes long) to cluster 1E. A pointer 45 is located at cluster 1E pointing to cluster 1F; cluster 1F points to cluster 20; etc. until an end pointer is identified. If the cluster size is equal to one sector then the desired file would be located in sectors 1E to 22, A4 etc.

With reference to FIGS. 6-8, the present invention introduces a cache memory which acts as an intermediary between the operating system (which assumes erasability of the medium) and the nonerasable medium. The cache memory includes an operating system disk allocation area and a medium directory area. The operating system writes to the cache disk allocation area as if it were writing onto an erasable medium. When all changes have been made to the cache disk allocation area, i.e. when an operating system command is completed, the disk allocation structure in the cache is used to build the medium's directory in the cache's medium directory area. The information that has changed is then written to the medium.

The cache disk allocation area, seen in FIG. 6, comprises a reserved sector 0, a single file allocation table in sectors 1-6, a directory in sectors 7-A and a file data area in sectors B-7FF. The area is 2048 sectors long, corresponding to a medium with one megabyte storage capacity. Only a single FAT is required since the nonerasable medium is considered to be reliable once the information is recorded. The size of the directory is determined by assigning space for a total of 64 directory entries, each 32 bytes long, and formatting 512 bytes per sector. The size of the FAT is determined by the total number of sectors (2048) less one reserved sector and 4 directory sectors times 1 ½ bytes per pointer in the FAT, and assuming 512 bytes per sector. Higher capacity media will generally require a larger directory, a larger FAT and 2 or more bytes per FAT pointer. The FAT is structured the same way as described above with reference to FIGS. 4 and 5A.

The cache's medium directory area, seen in FIG. 7, allocates one sector for each of the 64 directory entries. The remaining sectors in FIG. 7 correspond to the 2037 file data area sectors in FIG. 6. This format may of course be configured differently if the application requires it. Each directory entry shown in FIG. 7A is 512 bytes long, with the first 32 bytes being copied from the operating system directory entry in FIG. 6 according to the format disclosed above in FIG. 5B. The attribute byte B is typically set to read-only. The rest of the directory entry is used to save bad cluster numbers 47 in the file data area. The end of the bad cluster file is indicated by the designation FFFF. Because of the characteristics of write-once media, all writes are sequential. By saving only bad clusters (or erased clusters) in the directory entry, the cache's operating system file allocation structure can be recreated from just the standard directory entry and bad cluster list.

A write-once medium 49 in card format is shown in FIG. 8. Other formats, such as disks, tape or drums may also be used. One card which may be used is the optical data card described in U.S. Pat. No. 4,544,835 comprising a wallet size card base 51 on which a strip 53 of laser recordable direct-read-after-write optical storage material is disposed. Data is in the form of microscopic-size spots that contrast with the background field. The spots may be aligned in parallel tracks 55 on the strip 53, and the tracks may be divided into "sectors" of 512 bytes each, corresponding exactly to the cache's medium directory area.

With reference to FIG. 9, the method of the present invention carries out each of the six operations shown in FIG. 1 in the same manner as for erasable media except for the input and output operations. The input operation begins by deciding (Step 61) whether the operating request is for the FAT and directory or for a data file. If the request is for the FAT and directory, then the directory on the card in FIG. 8 will be read (Step 63) into the cache's media directory area in FIG. 7 and the cache's system file allocation area in FIG. 6 will be built (Step 65) from the information in the cache's media directory area. This process will be described below in greater detail with reference to FIG. 10. If the request is for a data file then the appropriate clusters will be read (Step 67) from the card into the cache and the data linked by the directory pointers into a chain which can be sent to the computer memory's transfer address. This process is described below in greater detail with reference to FIG. 11. The status word indicating the number of clusters successfully transferred will be reported (Step 69) and control returned to the operating system kernel.

With reference to FIG. 10., when the operating system requests that the FAT and directory be read from the medium, flags (such as error and status) are initialized (Step 71) then a check (Step 73) is made to see whether the same card is in the drive. If the card has been changed, the error flag is set (Step 75) and control is returned to the operating system. If the same card is in the drive, a check (Step 77) is then made to see whether the FAT and directory for that card has already been loaded into the cache's system file allocation area. If this is the case then another directory read is not required. If the FAT and directory have not yet been loaded, the directory is read (Step 79) from the card into the cache media directory area one cluster at a time and the system file allocation area is built (Step 81) in the cache from the directory information. When all clusters have been read, the cache files are closed (Step 83) and flags are set. Whether or not a card read was required, the FAT and directory in the cache system file allocation area are transferred (Step 85) to the computer memory's transfer address.

With reference to FIG. 11, when the operating system requests a data file to be read, flags and registers are initialized (Step 91); then a check (Step 93) is made to see whether the same card is in the drive. If a different card is in the drive then the error flag is set (Step 95) and control is returned to the operating system. If the same card is in the drive then based on the information in the cache's media directory area, clusters corresponding to that file are read (Step 97) in order, one at a time, into the cache until all clusters have been read. The number of clusters that need to be read are determined from the file size information in bytes 1C to 1F of the directory entry. How the head position is incremented is based on whether or not a cluster is listed as bad in the media directory entry stored on the cache. When there are no more clusters to read, the status word indicating the number of clusters successfully transferred is set (Step 99) and control is returned to the remainder of the routine in FIG. 9.

With reference to FIG. 12, the output operation of the present invention begins by deciding (Step 101) whether the write request relates to a FAT and directory or to a data file. If the operating system request is to write a FAT and directory, then the card directory is first built (Step 103) in the cache media directory area from the cache's system file allocation structure. Only when the cache directory is complete is it written (Step 105) onto the card. The process is discussed below in greater detail with reference to FIG. 13. If the operating system requests that a data file be written onto the card, then the file is transferred from the transfer address to the cache. The linked data is written (Step 107) onto available clusters on the card. One preferred method writes only data clusters which have changed from that already stored on the card. This is described below in greater detail with reference to FIG. 14 When the appropriate information has been transferred, the status word indicating the number of successfully transferred clusters is set (Step 109) and control is returned to the operating system.

With reference to FIG. 13, when the operating system requests that the FAT and directory be written to the card, the current FAT and directory are transferred from the transfer address in computer memory to the cache's system file allocation area (Step 111). Flags and registers are initialized (Step 113) and a check (Step 115) is made to see whether or not the same card is in the drive. If not, an error flag is set (Step 117) and control returns to the operating system. If the same card is in the drive, then checks (Steps 119 and 121) are made to see if a full FAT and full directory are loaded in the cache. If not, control is returned to the operating system to await further loading of the FAT and directory. Ordinarily the directory is transferred to the cache in three series. The first series, consisting of bytes 0 to 15 in FIG. 5B, are transferred. The second series, consisting of bytes 0 to 1C is transferred. Note that the original series is transferred again. Then the final series, consisting of bytes 0 to 1F, is transferred. At this point the directory is fully loaded. When both the FAT and directory are fully loaded in the cache, the operating system sector numbers (FIG. 6) are mapped (Step 123) to card sector numbers (FIG. 7) and the cache media directory area is built (Step 125) from the FAT, directory and attribute information in the cache system file allocation structure. If the operating system command is not yet complete then additional FAT and directory updates are likely and the process returns to the beginning of the write process. When no more FAT and directory writing is required by the operating system, the files are closed, flags set (Step 127) and the card directing in the cache is written (Step 105) to the card, as indicated in FIG. 12.

With reference to FIG. 14, when the operating system requests that a data file be written to the card, flags and registers are again initialized (Step 131) and a check (Step 133) is made to see if the same card is in the drive. If not, then the error flag is set (Step 135) and control is returned to the operating system. If the same card is in the drive, the data is transferred from the transfer address to the cache. The operating system sector numbers (FIG. 6) are mapped (Step 137) to the card sector numbers (FIG. 7), and a comparison (Step 139) is made with the data already on the card. If the file is a new file, then all the data is new and is written (Step 141) to the card cluster by cluster until transfer is complete. If the file is old, the clusters in which data is changed are linked (Step 143) into the data file with new pointers being created (Step 145) to connect their clusters with unmodified portions of the file. The pointers to the "old" data is marked (Step 143) as deleted. The last step is writing (Step 141) the modified pointers and data to the card cluster by cluster. When transfer is complete, the status flag is set (Step 147) to the number of clusters transferred and control returned to the operating system.

Earlier, when referring to FIGS. 6–8, it was indicated that the attribute B in the directory entries are typically set to "read-only". Alternatively, if we lift the read-only limitation for the media directory entries, then there is a way of showing when a file was last updated. With reference to FIG. 15, each card directory entry is divided into sectors 151a,b,c, . . . ,z, and 152. The first sector 151a contains the 32 bytes copy of the operating system directory entry; the second sector 151b contains up to 16 bad cluster locations that were identified the first time the file was written. If more than 16 bad clusters exist, then other sectors 151c, etc., can be used, unless the application limits the use of the card whenever more than 16 bad clusters exist in any region. If the file is erased, then the next to the last sector 151z will flag this condition. If an updated file is created the last sector 152 in the laser card directory entry will point to the corresponding laser card directory entry 153a,b,c, . . . containing the updated file. This scheme rewrites the whole data file to new locations every time there is an update of the file.

Another scheme, shown in FIG. 16, is to have each data file linked with pointers. Each data cluster 155 is appended with two sectors 157 and 158. The first of these sectors 157 will link the cluster 155 to the next data cluster 159. The second of these sectors will be used, as is pointer 161, only if the next data cluster 163 has been changed, and will point to the new data cluster 165.

Any of these variations of directory entry format can be configured by the user at the time the driver is installed, depending on the specific applications. If a limitation of not more than 16 bad clusters per card is set, then the card directory does not need to be more that 4 sectors long, and this allows a user to enter more than one card directory entry per card track (currently 1 track=512 bytes=16 32-byte sectors).

I claim:

1. A method of transferring information files between a computer memory of a computer system and a write-once storage medium of said computer system comprising, providing a temporary memory in said computer system which is accessible to both said computer memory and said write-once storage medium, said temporary memory having designated memory areas assigned by said computer system which include a system file allocation area with specified record areas corresponding to file allocation and directory record areas for erasable media, a media directory area with specified record areas corresponding to file directory record areas for a write-once storage medium, and a data file area, reading a file directory from said write-once storage medium into said media directory area of said temporary memory, forming a file allocation table and an operating system directory in said record areas of said system file allocation area of said temporary memory by a transfer of corresponding information from specified record areas of said media directory area containing said file directory read from said write-once storage medium in accord with a computer operating system command, transferring specified data files between said computer memory and said write-once medium, said transfer of data files performed only via said data file area of said temporary memory, updating record areas in said system file allocation area that correspond to the transferred data file in accord with said computer operating system command, writing to corresponding record areas of the media directory area of the temporary memory to include information from said updated record areas in said system file allocation area, and writing any changes in said media directory area information to said write-once medium at the end of a completed operating system command.

2. A method of inputting an information file stored on a write-once medium of a computer system into computer memory of said computer system, comprising, providing a temporary memory in said computer system which is accessible to both said computer memory and said write-once storage medium, said temporary memory having designated memory areas assigned by said computer system which include a system file allocation area, a medium directory area and a data file area, said system file allocation area further subdivided into areas forming a file allocation table and an operating system directory, reading a file directory from a write-once medium into said medium directory area of said temporary memory, transferring file directory information to record areas of said system file allocation area of said temporary memory from corresponding record areas in said medium directory area, said file allocation area having record areas corresponding to file allocation and directory record areas for erasable media, and transferring said file directory information from said record areas of said file allocation area in temporary memory to a computer system memory address.

3. The method of claim 2 further comprising, requesting a data file identified in said file allocation area, mapping sector locations of said data file in said file allocation area of said temporary memory to corresponding sector locations in said medium directory area of said temporary memory, and reading each corresponding sector location from said write-once medium to said computer system memory address.

4. The method of claim 2 wherein said file directory read from said medium is configured with a first portion containing information in a format corresponding to erasable media and a second portion containing at least one list of bad cluster numbers, and wherein said step of transferring file directory information to said system file allocation area comprises copying said first portion to said operating system directory of said file allocation area and forming a table of pointers in said file allocation table of said file allocation area beginning at a starting cluster indicated in said first portion and incrementing said pointers while skipping over said bad cluster numbers indicated in the last list of such numbers in said second portion.

5. The method of claim 2 wherein said file directory read from said medium is configured with a first portion containing information in a format corresponding to erasable media, including a starting cluster number, and a second portion containing a pointer to another directory entry.

6. A method of outputting an information file in a computer memory of a computer system to a write-once medium of said computer system comprising, providing a temporary memory in said computer system which is accessible to both said computer memory and said write-once storage medium, said temporary memory having designated memory areas assigned by said computer system which include a system file allocation area, a medium directory area and a data file area, transferring in accord with a computer operating system command from computer memory to record areas of said file allocation area a complete file allocation structure having records in a format corresponding to that of file allocation and directory records for erasable media, said file allocation structure including a file allocation table and a system directory, forming in said medium directory area, a file directory having records in a format corresponding to that of file directory records for a writ-one medium from said file allocation structure in said file allocation area, said file directory having a directory entry corresponding to a first data file written on said write-once medium, said directory entry including pointer information capable of linking sectors on said write-once medium, and write said file directory entry corresponding to said first data file to said write-once medium at the end of a completed operating system command.

7. The method of claim 6 further comprising, transferring a second data file from computer memory to said data file area of said temporary memory, said second data file corresponding to said first data file but having new data, forming a map from sector locations for said second data file contained in records of said file allocation table to corresponding sector locations for said first data file stored on said write-once medium contained in records of said media directory area, identifying sectors of said second data file containing new data, marking sectors of said first data file on said write-once medium corresponding to said identified sectors of said second data file as old sectors and writing pointers to new sectors on said medium, and writing said identified sectors of said second data file to said new sectors on said medium.

8. A method of transferring a requested information file, which includes one or more data files and is stored on a write-once medium that has a data file directory, into computer memory, the method comprising the steps of:

formatting a temporary memory to include a system file allocation area, a medium directory area and a data file area;

providing each data file in said data file area with a data file directory entry, said data file directory entry including a first sector that identifies the directory entry for the next data file to be read and including a second sector, said second sector having a predetermined default entry if the next data file to be read has not been changed, and if the next data file to be read has been changed the second sector contains instead an override address for the directory entry for the next data file that overrides the directory entry specified in the first sector;

reading a file directory from the write-once medium into the medium directory area of the temporary memory;

forming a file allocation table and operating system directory in the system file allocation area of the temporary memory from the file directory in a format that corresponds to the format of a file allocation table and operating system directory for an erasable medium; and if the information file transfer request refers to a file allocation table or an operating system directory, the method comprises the further step of:

transferring the requested file allocation table and operating system directory from said system file allocation area to a sequence of computer memory addresses that are specified by an operating system;

if the information file transfer request refers to a data file, the method comprises the further steps of:

requesting a data file identified by a data file directory entry;

mapping sector locations of the identified data file that are specified in the file allocation area to corresponding sector locations in the medium directory area;

writing the information contained in each sector location in the medium directory area to a sequence of computer memory addresses specified by the operating system; and repeating steps D1, D2 and D3 for each data file in the information file to be transferred.

9. The method of claim 8, wherein said file directory includes a first portion that contains file directory information that is presented in a format that corresponds to a format used for erasable media, and a second portion that contains an error list of transferred data files that have been determined to have errors therein, where the step of forming said file allocation table and directory further comprises the steps of:

copying the first portion of the file directory to said file allocation table and directory;

forming a table of said data file directory entries and moving consecutively through this table and comparing each data file directory entry with each of the entries in the error list; and ignoring or deleting each data file directory entry that is contained in the error list, for purposes of transfer of said information file from said write-once storage medium to said computer memory.

* * * * *

UNITED STATES PATENT AND TRADEMARK OFFICE
CERTIFICATE OF CORRECTION

PATENT NO. : 5,029,125

DATED : July 2, 1991

INVENTOR(S) : Luis H. Sciupac

It is certified that error appears in the above-identified patent and that said Letters Patent is hereby corrected as shown below:

```
Column 7, line 33, "Fig 14 When" should read
      - - Fig. 14.  When - -.

Claim 6, column 10, line 49, "a writ-one medium"
      should read - - -- a write-one medium--.
      line 56, "write" should read - - writing - -.

Claim 8, column 12, line 4, before "transferring"
      insert - - (F1) - -; line 10, before "requesting"
      insert - - (D1) - -; line 12, before "mapping"
      insert - - (D2) - -; line 16, before "writing"
      insert - - (D3) - -.
```

Signed and Sealed this

First Day of December, 1992

*Attest:*

DOUGLAS B. COMER

*Attesting Officer*    Acting Commissioner of Patents and Trademarks